United States Patent [19]

Anderson

[11] 4,320,043

[45] Mar. 16, 1982

[54] FURFURYL ALCOHOL-DIALDEHYDE FOUNDRY BINDERS

[75] Inventor: Hugh C. Anderson, Barrington, Ill.

[73] Assignee: The Quaker Oats Company, Chicago, Ill.

[21] Appl. No.: 224,150

[22] Filed: Jan. 12, 1981

[51] Int. Cl.$^3$ .......................... C08G 8/04; C08L 61/06
[52] U.S. Cl. .................................... 523/144; 164/526; 260/998.18; 528/137; 528/143; 528/153; 528/159; 528/242; 528/245; 528/249; 524/588; 524/593; 524/594
[58] Field of Search .................. 260/38, 42.15, 998.18, 260/37 R; 164/526; 528/249, 242, 245, 137, 143, 153, 159

[56] References Cited

U.S. PATENT DOCUMENTS

| | | | |
|---|---|---|---|
| 3,403,721 | 10/1968 | Robins et al. | 164/526 |
| 3,409,579 | 11/1968 | Robins | 260/38 |
| 3,681,287 | 8/1972 | Brown et al. | 528/249 |
| 4,108,809 | 8/1978 | Narayan et al. | 528/153 |

*Primary Examiner*—J. Ziegler
*Attorney, Agent, or Firm*—Neuman, Williams, Anderson & Olson

[57] ABSTRACT

Binders for foundry core sands and the like comprising furfuryl alcohol and an aromatic dialdehyde and optionally an aromatic alcohol.

7 Claims, No Drawings

FURFURYL ALCOHOL-DIALDEHYDE FOUNDRY BINDERS

The present invention relates to chemical compositions and methods useful in metal founding, and more particularly, to binders for core sand and the like used in metal foundries.

The expression "core sand" is used herein to include sand used in making shapes of all sorts for foundry purposes, including sand shapes which are to be used as mold cores, sand shapes useful in other casting processes, including sand shapes which are made in patterns and cured therein as well as free standing sand shapes which may be cured in conventional ovens or in microwave ovens for any desirable purpose in foundry work.

While prior art catalyst and binder systems have functioned satisfactorily in many respects, as the cost of labor and the cost of maintaining production facilities have increased, it has become economically important to mix core sand with binders in larger quantities to increase production and reduce costs. Yet, it is highly desired that the binder provide a high tensile strength to the finished components and under high and low humidity conditions.

It is therefore a principal object of this invention to provide compositions which can be advantageously used as binders for core sands and the like used in metal founding operations.

The binder compositions of this invention comprise furfuryl alcohol and an aromatic dialdehyde. In an optional embodiment, an aromatic alcohol can also be included in the binder compositions in partial replacement of the dialdehyde. Representative of the aromatic dialdehyde components of the binder are terephthaldicarboxaldehyde, isophthaldicarboxaldehyde, o-phthalicdicarboxaldehyde, 2,5-dialdehydehydofuran,

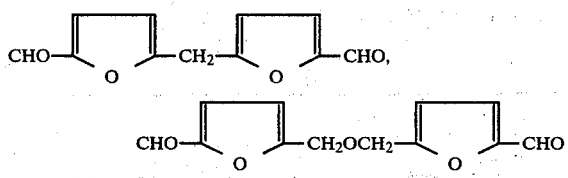

and the like.

Representative of the aromatic alcohol component of the binder are phenol, resorcinol, bisphenol A, catechol, hydroquinone, xylenols, phlorglucinol, pyrogallol, cresols and the like.

The aromatic dialdehyde component is used in amounts ranging from about 1.0% up to its limit of solubility in furfuryl alcohol. Generally the amount of aromatic dialdehyde used in the binder composition is within the range of about 3 to 10% by weight of furfuryl alcohol.

In the optional embodiment, an aromatic alcohol can be used to replace from 5.0 to 50.0% by weight of the aromatic dialdehyde. It is generally preferred that the amount of aromatic aldehyde in the binder be 5-20% by weight of the dialdehyde.

The binders of this invention are applied to aggregate materials in conventional manner and are catalyzed to form a rigid material by acids such as toluene-sulfonic acid, phosphoric acid, benzene-sulfonic acid, xylene-sulfonic acid, phenolsulfonic acid, methanesulfonic acid and the like, as well as other acid catalysts known and used in the art. The catalysts can be applied to the sand followed by application of the binder thereto or the catalysts can be admixed with the binder and the mixture applied thereto. In any event, the acid catalysts are used in amounts ranging from about 10 to 50% by weight of the binder. Curing of the binders is accomplished at room temperature.

The amount of binder which is used in the acid hardenable mix is any amount which would normally be used in a bound sand mix for foundry purposes; and, for example sand mixes which have incorporated therein the binder of the present invention in an amount from 0.5 to about 3.0 percent are, generally speaking, satisfactory in accordance with the present invention.

When using the binders in producing core sands, it is generally preferred to use with the binders of this invention a silane glass or silica adhesion promoter in an amount ranging from about 0.1% to 3% based on the weight of the binder. Such silane adhesion promoters are well known in the art and include for example, gamma-mercaptopropyltrimethoxysilane, N-beta-(aminoethyl)-gamma-aminopropyltrimethoxysilane, beta-(3,4-epoxycyclohexyl)ethyltrimethoxysilane, gamma-glycidoxypropyltrimethoxysilane, gamma-aminopropyltriphenoxysilane, gamma-aminopropyltribenzoyoxysilane, gamma-aminopropyltrifurfuroxysilane, gamma-aminopropyltri (o-chlorophenoxy)silane, gamma-aminopropyltri (p-chlorophenoxy)silane, gamma-aminopropyltri(tetrahydrofurfuroxy)silane, methyl[2-gamma-triethoxysilypropylamino)ethyl amino]3-propionate in methanol, modified aminoorganosilane, Ureido-silane, mercaptoethyltriethoxysilane, chloropropyltrimethoxysilane, vinyltrichlorosilane, vinyltriethoxysilane, vinyltrimethoxysilane, gamma-methacryloxypropyltrimethoxysilane, gamma-methacryloxypropyltri(2-methoxyethoxy)silane, gamma-glycidoxypropyltrimethoxysilane, vinyltriacetoxysilane, gamma-mercaptopropyltrimethoxysilane, gamma-aminopropyltriethoxysilane, N-beta(aminoethyl)-gamma-amino-propyltrimethoxysilane.

The advantages of the present invention will be further apparent from the following examples.

EXAMPLE 1

Binder compositions containing 95% by weight of furfuryl alcohol and 5% of various additives were tested as binders for foundry core sand. In these tests a foundry sand mix (Wedron 5025 sand) was prepared by first admixing and mulling 3,000 parts by weigh of the foundry sand and 20% (based on binder) of a 65% solution of toluene sulfonic acid in water until distribution of the acid on the sand was uniform. Then the resulting sand/acid mix and 1.5% of the binder mixture (based on the weight of the sand) was added in each instance and the complete mixture was mulled further until all of the components were uniformly distributed on the grains of sand. Immediately after this final mulling, the mix was packed into four 12-cavity molds to form dumbbell-type bars of one inch cross section. After the bars had been cured enough to be handled without breaking, they were removed from the mold. Twenty-four bars were placed in a high humidity cabinet for storage overnight at 80% relative humidity (RH) and 24 bars were subjected to a low relative humidity (RH) of 40% for overnight storage. After overnight storage the tensile strengths were determined, with the average tensile strength range under the low and high humidity conditions being summarized in the table below. The bench life is determined by the use of a Dietert sand rammer. The bench life is arbitrarily determined as the time at which the number of rams required to reach the present volume is double the number of rams initially required to reach that volume.

TABLE I

| Additive | Tensile Strength, p.s.i. | | | | Bench Life (minutes) |
|---|---|---|---|---|---|
| | 40% RH | | 80% RH | | |
| | Average | Range | Average | Range | |
| Resorcinol | 465 | 310–600 | 399 | 145–575 | 14 |
| Terephthaldehyde | 510 | 250–690 | 428 | 300–550 | 18 |
| Bisphenol A | 382 | 325–460 | 301 | 190–390 | 16 |
| O-Cresol | 328 | 145–420 | 294 | 210–390 | 16 |
| Dimethylol Ethylene Urea | 417 | 310–510 | 378 | 250–485 | 30 |
| Dimethoxydihydrofuran | 369 | 225–480 | 338 | 170–485 | 24 |
| Dimethoxytetrahydryfuran | 398 | 225–525 | 363 | 200–525 | 26 |
| Safrole | 343 | 60–490 | 323 | 125–455 | 19 |
| Trimethylolpropane | 346 | 230–450 | 254 | 160–375 | 30 |
| Aluminum acetylacetonate | 221 | 175–300 | 212 | 125–295 | 26 |
| 2,4-dihydroxybenzaldehyde | 303 | 175–440 | 275 | 140–405 | 17 |
| Furfural | 365 | 255–525 | 308 | 170–420 | 24 |
| Furfurylidene ethylene acetal | 334 | 180–470 | 280 | 155–375 | 32 |
| Benzophenone tetracarboxylic dianhydride | 278 | 150–390 | 244 | 120–370 | 17 |
| Chem Rez-A280* | 542 | 385–740 | 413 | 205–550 | 6 |

*A commercially available foundry sand binder which is believed to be a copolymer of furfuryl alcohol and formaldehyde dissolved in furfuryl alcohol (manufactured by Ashland Chemical Company).

EXAMPLE 2

Compositions containing various amounts of terephthaldehyde (TPAL) and furfuryl alcohol were tested as binders for foundry core sands. In these tests a foundry core sand was prepared using 3.0 kilograms of Wedron 5025 sand, 30 grams of the binders shown in the table below containing 0.3% A1160* silane and 6.0 grams of a 65% solution of toluene sulfonic acid. Sand bars were prepared and tested as described in Example 1 with the humidity conditions being 25% RH and 89% RH. The test results were as follows:

TABLE II

| Binder | | Tensile Strength, psi | | Bench Life (minutes) |
|---|---|---|---|---|
| % TPAL | % Furfuryl Alcohol | 25% RH | 89% RH | |
| 2.5 | 97.5 | 345 | 205 | 30 |
| 5.0 | 95.0 | 360 | 260 | 24 |
| 7.5 | 93.5 | 395 | 270 | 22 |
| 10.0 | 90.0 | 425 | 230 | 16 |
| 12.5 | 88.5 | 475 | 260 | 13 |
| 100% Furfuryl Alcohol | | 295 | 180 | 30 |
| 95% Furfuryl Alcohol + 5% Resorcinol | | 340 | 225 | 13 |

*A1160 silane is a ureido-silane commonly used in foundry binders as an adhesion promoter.

EXAMPLE 3

Following the procedures of Example 2, various amount of 2,5-dialdehydehydofuran and furfuryl alcohol were tested as binders for foundry core sands. The test results were as follows:

TABLE III

| Binder | | Tensile Strength, psi | | Bench Life (minutes) |
|---|---|---|---|---|
| % 2,5-dialdehyde-hydrofuran | % Furfuryl Alcohol | 25% RH | 89% RH | |
| 2.5 | 97.5 | 325 | 250 | 27 |
| 5.0 | 95.0 | 345 | 220 | 20 |
| 7.5 | 93.5 | 350 | 210 | 22 |
| 10.0 | 90.0 | 415 | 230 | 19 |
| 12.5 | 88.5 | 420 | 200 | 20 |
| 100% Furfuryl Alcohol | | 295 | 180 | 30 |
| 95% Furfuryl Alcohol + 5% Resorcinol | | 340 | 225 | 13 |

EXAMPLE 4

Following the procedures of Example 2, varying amounts of terephthaldehyde (TPAL) were combined with furfuryl alcohol. In this example tensile strengths were determined after storage overnight at relative humidities of 56% and 90%. The data are shown below:

TABLE IV

| Binder | | Tensile Strength, psi | | Bench Life (minutes) |
|---|---|---|---|---|
| % TPAL | % Furfuryl Alcohol | 56% RH | 91% RH | |
| 2.5 | 97.5 | 295 | 200 | 39 |
| 5.0 | 95.0 | 420 | 300 | 27 |
| 7.5 | 93.5 | 370 | 305 | 12 |
| 10.0 | 90.0 | 410 | 295 | 14 |
| 100% Furfuryl Alcohol Control | | 295 | 212 | 39 |
| 95% Furfuryl Alcohol + 5% Resorcinol Control | | 325 | 272 | 20 |

EXAMPLE 5

Following the procedure of Example 2, tests were conducted with binders comprising furfuryl alcohol and aromatic aldehydes. Tensile strengths were determined after storage overnight at relative humidities of 34% and 90%. Test results are shown below:

TABLE V

| Binder | Tensile Strength, p.s.i. | | Bench Life (Minutes) |
|---|---|---|---|
| | 34% R.H. | 90% R.H. | |
| 10% | | | |

TABLE V-continued

| Binder | | Tensile Strength, p.s.i. 34% R.H. | Tensile Strength, p.s.i. 90% R.H. | Bench Life (Minutes) |
|---|---|---|---|---|
| Terephthaldehyde 10% | 90% Furfuryl Alcohol | 380 | 280 | 14 |
| 2,5-Dialdehydrofuran 10% | 90% Furfuryl Alcohol | 410 | 285 | 17 |
| Benzaldehyde 10% | 90% Furfuryl Alcohol | 370 | 280 | 27 |
| Furfural 10% | 90% Furfuryl Alcohol | 345 | 265 | 23 |
| 100% Furfuryl Alcohol Control | | 260 | 200 | 28 |
| 90% Furfuryl Alcohol + 5% Resorcinol Control | | 360 | 230 | 17 |

EXAMPLE 6

Following the procedure of Example 2, binder compositions comprising furfuryl alcohol, an aldehyde and an alcohol were tested. Tensile strengths were determined after storage overnight at relative humidities of 59% and 91%. The data are shown below:

TABLE VI

| Composition of Binder* | Tensile Strength, p.s.i. 59% R.H. | Tensile Strength, p.s.i. 91% R.H. | Bench Life (Minutes) |
|---|---|---|---|
| RES/TPAL/FCH$_2$OH(2.5/2.5/95.0) | 395 | 312 | 18 |
| BPA/TPAL/FCH$_2$OH(2.5/2.5/95.0) | 360 | 315 | 24 |
| Ph/TPAL/FCH$_2$OH(2.5/2.5/95.0) | 370 | 300 | 24 |
| RES/TPAL/FCH$_2$OH(3.75/3.75/92.5) | 385 | 305 | 27 |
| BPA/TPAL/FCH$_2$OH(3.75/3.75/92.5) | 360 | 250 | 32 |
| Ph/TPAL/FCH$_2$OH(3.75/3.75/92.5) | 345 | 235 | 33 |
| RES/TPAL/FCH$_2$OH(5.0/5.0/90.0) | 420 | 320 | 12 |
| BPA/TPAL/FCH$_2$OH(5.0/5.0/90.0) | 380 | 270 | 23 |
| Ph/TPAL/FCH$_2$OH(5.0/5.0/90.0) | 380 | 270 | 29 |
| RES/TPAL/FCH$_2$OH(7.5/7.5/85.0) | 340 | 240 | 5 |
| BPA/TPAL/FCH$_2$OH(7.5/7.5/85.0) | 355 | 225 | 20 |
| Ph/TPAL/FCH$_2$OH(7.5/7.5/85.0) | 330 | 200 | 24 |
| RES/TPAL/FCH$_2$OH(10.0/10.0/80.0) | 300 | 250 | 4 |
| BPA/TPAL/FCH$_2$OH(10.0/10.0/80.0) | 340 | 250 | 19 |
| Ph/TPAL/FCH$_2$OH(10.0/10/0/80.0) | 310 | 220 | 19 |
| FCH$_2$OH Control | 298 | 216 | 40 |
| FAR 5 Control | 342 | 266 | 22 |
| FAB 5 Control | 315 | 245 | 34 |
| FAP 5 Control | 320 | 235 | 26 |

*RES = Resorcinol
TPAL = terephthaldehyde
FCH$_2$OH = furfuryl alcohol
BPA = Bisphenol A
Ph = Phenol
FAR 5 Control = 95% furfuryl alcohol; 5% resorcinol
FAB 5 Control = 95% furfuryl alcohol; 5% Bisphenol A
FAP 5 Control = 95% furfuryl alcohol; 5% phenol

EXAMPLE 7

Following the general procedure of Example 2, tests were conducted on binder compositions comprising furfuryl alcohol (FCH$_2$OH) and terephthaldehyde (TPAL) and a Novolak resin. The Novolak resin used was Plenco 1617 available from Plastics Engineering Company, Sheboygan, Wis., and was unneutralized and without hexamethylenetetramine. Tensile strengths were determined after storage overnight at relative humidities of 30% and 90%. The results are shown in the table below:

TABLE VII

| % Novolak | % TPAL | % FCH$_2$OH | Tensile Strength, p.s.i. 30% RH | Tensile Strength, p.s.i. 90% RH | Bench Life (Minutes) |
|---|---|---|---|---|---|
| 2.5 | 2.5 | 95.0 | 500 | 315 | 23 |
| 2.75 | 3.75 | 92.5 | 535 | 325 | 20 |
| 5.0 | 5.0 | 90.0 | 555 | 335 | 17 |
| 7.5 | 7.5 | 85.0 | 575 | 330 | 10 |
| 10.0 | 10.0 | 80.0 | 560 | 325 | 6 |
| 5.0 | | 95.0 | 465 | 270 | 21 |
| 100% Furfuryl Alcohol Control | | | 435 | 280 | 23 |
| 95% Furfuryl Alcohol + 5% Resorcinol Control | | | 500 | 290 | 15 |

The "no-bake" binders of the invention can be advantageously used as binders for shaped composite articles, such as particle board, fiberglass board, accoustical tile and the like, in which high tensile strength under low and high humidity conditions is desired. Other binder materials can be blended with the binders of the invention for particular applications.

Those modifications and equivalents which fall within the spirit of the invention are to be considered a part thereof.

What is claimed is:

1. A binder composition comprising furfuryl alcohol and an aromatic dialdehyde.

2. A binder in accordance with claim 1 wherein the binder also includes an aromatic alcohol.

3. A binder in accordance with claim 1 which also includes a silane.

4. A binder for foundry core sands in accordance with claim 1.

5. A process for manufacturing foundry sand shapes for use as cores and molds comprising placing a sand mix in a shaping element and hardening the mix in the shaping element, the sand mix comprising sand, an acid catalyst and a binder comprising furfuryl alcohol and an aromatic dialdehyde.

6. A process in accordance with claim 5 in which the binder also includes a silane.

7. A process in accordance with claim 5 wherein the binder also includes an aromatic alcohol.

* * * * *